US012786116B2

(12) United States Patent
Nallamothu et al.

(10) Patent No.: US 12,786,116 B2
(45) Date of Patent: Nov. 3, 2026

(54) REDUNDANT CONTAINERIZED VIRTUAL ROUTERS FOR USE WITH A VIRTUAL PRIVATE CLOUD

(71) Applicant: Juniper Networks, Inc., Sunnyvale, CA (US)

(72) Inventors: Vinay K Nallamothu, Sunnyvale, CA (US); Muhammad Qasim Arham, Frisco, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 712 days.

(21) Appl. No.: 18/345,737

(22) Filed: Jun. 30, 2023

(65) Prior Publication Data

US 2025/0007829 A1 Jan. 2, 2025

(51) Int. Cl.
*H04L 45/586* (2022.01)
*H04L 45/28* (2022.01)
*H04L 45/745* (2022.01)

(52) U.S. Cl.
CPC ............ *H04L 45/586* (2013.01); *H04L 45/28* (2013.01); *H04L 45/745* (2013.01)

(58) Field of Classification Search
CPC ...... H04L 45/586; H04L 45/28; H04L 45/745
USPC .......................................................... 709/238
See application file for complete search history.

(56) References Cited

U.S. PATENT DOCUMENTS

2020/0073692 A1 3/2020 Rao et al.
2022/0279222 A1 9/2022 Newell et al.
2022/0279420 A1 9/2022 Akkipeddi et al.
2024/0039792 A1* 2/2024 Berzin ................ H04L 41/0895
2025/0007828 A1 1/2025 Nallamothu et al.
2025/0007829 A1* 1/2025 Nallamothu ........ G06F 9/45558

FOREIGN PATENT DOCUMENTS

EP 3824602 B1 5/2022
EP 4149064 A1 3/2023

OTHER PUBLICATIONS

Anonymous et al., "Junos Containerized Routing Protocol Daemon", Nov. 30, 2020, pp. 1-3.

(Continued)

*Primary Examiner* — Hermon Asres
(74) *Attorney, Agent, or Firm* — Shumaker & Sieffert P.A.

(57) ABSTRACT

An example computing device includes a first containerized router and processing circuitry. The computing device includes a containerized virtual router configured to execute on the processing circuitry and configured to implement a data plane for the first containerized router. The computing device includes a containerized routing protocol process configured to execute on the processing circuitry and configured to implement a control plane for the first containerized router wherein the containerized routing protocol process is configured to execute a routing protocol. The first containerized router is configured to program a virtual private cloud (VPC) route table in a VPC gateway based on routing information received by the containerized routing protocol process via the routing protocol. The first containerized router is communicatively coupled to a second containerized router via a virtual router redundancy protocol (VRRP) session.

20 Claims, 5 Drawing Sheets

(56) References Cited

OTHER PUBLICATIONS

Kn et al., "Day One: Contrail DPDK vRouter", DPDK Contrail, Juniper Networks, Inc., Jan. 1, 2021, pp. 1-196.
Extended Search Report from counterpart European Application No. 23216697.5 dated Feb. 28, 2024, 7 pp.
Notice of Intent to Grant and Text Intended to Grant from counterpart European Application No. 23216697.5 dated Dec. 3, 2025, 102 pp.
Office Action from U.S. Appl. No. 18/345,707 dated Jan. 7, 2026, 12 pp.
"Juniper Cloud-Native Router Deployment Guide," Juniper Networks, Inc., Oct. 3, 2022, 54 pp.
U.S. Appl. No. 18/345,707, filed Jun. 30, 2023, by Nallamothu et al.
Response to Extended Search Report dated Feb. 28, 2025, from counterpart European Application No. 23216697.5 filed Jun. 16, 2025, 12 pp.
U.S. Appl. No. 18/620,460, filed Mar. 28, 2024, by Henkel et al.
U.S. Appl. No. 19/096,276, issued Mar. 31, 2025, by Sikand et al.

* cited by examiner

REDUNDANT CONTAINERIZED VIRTUAL ROUTERS FOR USE WITH A VIRTUAL PRIVATE CLOUD

TECHNICAL FIELD

The disclosure relates to virtualized computing infrastructure and, more specifically, to a containerized router for use in a cloud computing environment.

BACKGROUND

In a typical cloud data center environment, there is a large collection of interconnected servers that provide computing and/or storage capacity to run various applications. For example, a data center may include a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

A cloud data center environment, such as a virtualized data center may provide services for any number of customers. For example, a cloud data center environment may provide services to different customers via virtual private clouds (VPCs). A VPC may be viewed as an extension of a customer operated on-premises (on-prem) network which may be located on the premises of a customer site. As such, through the use of a VPC, a customer may quickly and efficiently scale their on-prem network as needed by adding or subtracting resources resident in a cloud data center through a VPC rather than changing the resources in the on-prem network itself. A VPC implementation may include the use of a virtual private cloud gateway device.

SUMMARY

A VPC is a virtual network of computing nodes that may resemble a traditional network that an enterprise may operate in an on-premises (on-prem) data center or an extension of such a traditional network. A VPC may be a service offered by a service provider in a cloud computing infrastructure. As a cloud computing infrastructure may include numerous resources which may be assigned to various customers, a customer may quickly and efficiently scale its own network resources through the use of a VPC, avoiding having to physically scale the on-prem data center. A VPC may include one or more subnets. A subnet may include a range of IP addresses of a VPC. A VPC gateway may connect a VPC to a network external to the VPN. A VPC may provide connectivity for an on-prem data center to virtual compute instances (e.g., Pods, virtual machines, and/or other types of deployable virtual compute instance) operating in the cloud computing environment, thereby expanding the compute capabilities of the on-prem data center without physically adding additional resources to the on-prem data center.

A VPC gateway is a physical or virtual device that may be used by a cloud service provider to provide access to a VPC for a customer. In some examples, a VPC gateway may not provide a mechanism for interacting with an underlay network using standard networking protocols. For example, a VPC gateway may not be capable of reading or learning from BGP prefixes. In other words, a VPC gateway may not be a BGP speaker. Thus, the VPC gateway may not be natively capable of routing or switching BGP traffic to or from BGP speaking virtual compute instances in the data center environment. Thus, there may be a need to provide seamless connectivity between customer workloads of a VPC and on-prem infrastructure.

A containerized routing protocol daemon (cRPD) is a routing protocol process that is packaged and deployed as a container. cRPD may be executed in the user space of the host as a containerized process. Thus, cRPD makes available the rich routing software pedigree of physical routers on compute nodes. cRPD provides control plane functionality to a containerized router. Existing implementations of cRPD (running on the host) use the forwarding provided by the kernel. This control plane is thus containerized. The compute nodes and kernel may be Linux-based in some examples.

A virtual router is a software entity that provides data plane functionality on the compute node, while the cRPD may provide the control plane functionality. The compute node may be hosting virtual compute instances centrally orchestrated and provisioned. In some cases, the virtual router may further interact with an SDN controller to create overlay networks by exchanging routes, configurations, and other data. A virtual router can run as either a kernel module or a DPDK-based process, for instance. DPDK allows a virtual router to process more packets per second than is possible when running as a kernel module. The virtual router data plane may be containerized. In combination, the containerized cRPD and containerized virtual router may thus be a fully functional, containerized router.

In general, this disclosure describes techniques for utilizing a containerized router operating within a public cloud environment to provide routing control plane functionality for VPC workloads reachable via VPC gateways. The containerized router may execute a routing protocol to learn routes associated with the VPC workloads and may program a VPC route table in a VPC gateway device to cause the VPC gateway device to route traffic towards the containerized router for further routing. Such traffic may include traffic from one or more containers (also referred to as pods). Such an arrangement may be beneficial as the pods and on-prem routers may include border gateway protocol (BGP) speakers, but the VPC gateway may not be BGP-enabled and therefore unable to process BGP advertisements or BGP-advertised routing information to determine how to route overlay traffic sourced by or destined to workloads in a VPC, such as BGP traffic.

This disclosure also describes techniques for utilizing redundant containerized routers in a public cloud environment. The redundant containerized routers may connect with each other, for example, via a virtual router redundancy protocol (VRRP) session. A first containerized router of the redundant containerized routers may determine, via the VRRP session, that the first containerized router is an active containerized router. The first containerized router may connect to a VPC gateway and program a VPC route table in a VPC gateway.

In an example, a computing device includes a containerized router, the computing device comprising: processing circuitry; a containerized virtual router configured to execute on the processing circuitry and configured to implement a data plane for the containerized router; a containerized routing protocol process configured to execute on the processing circuitry and configured to implement a control plane for the containerized router, wherein the containerized routing protocol process is configured to execute a routing protocol; and a process configured to program a virtual private cloud (VPC) route table in a VPC gateway based on routing information received by the containerized routing protocol process via the routing protocol.

In an example, a method includes connecting, by a process configured to program a virtual private cloud (VPC) route table in a VPC gateway based on routing information received by a containerized routing protocol process via a routing protocol, to the VPC gateway; and programming, by the process configured to program the VPC route table, the VPC route table in the VPC gateway. In an example, a non-transitory, computer readable medium stores instructions, which when executed cause processing circuitry to In another example, a non-transitory, computer readable medium stores instructions, which when executed cause processing circuitry to connect, by a process configured to program a virtual private cloud (VPC) route table in a VPC gateway based on routing information received by a containerized routing protocol process via a routing protocol, to the VPC gateway; and program, by the process configured to program the VPC route table, the VPC route table in the VPC gateway.

In another example, a computing device includes a first containerized router, the computing device comprising: processing circuitry; a containerized virtual router configured to execute on the processing circuitry and configured to implement a data plane for the first containerized router; and a containerized routing protocol process configured to execute on the processing circuitry and configured to implement a control plane for the first containerized router wherein the containerized routing protocol process is configured to execute a routing protocol, wherein the first containerized router is configured to program a virtual private cloud (VPC) route table in a VPC gateway based on routing information received by the containerized routing protocol process via the routing protocol and wherein the first containerized router is communicatively coupled to a second containerized router via a virtual router redundancy protocol (VRRP) session.

In another example, a method includes connecting, by a first containerized router to a second containerized router, via a virtual router redundancy protocol (VRRP) session; determining, via the VRRP session, that the first containerized router is an active containerized router of the first containerized router and the second containerized router; connecting to a virtual private cloud (VPC) gateway; and programming, by the process configured to program the VPC route table, and based on the first containerized router being the active containerized router, the VPC route table in the VPC gateway.

In another example, a non-transitory, computer readable medium stores instructions, which when executed cause processing circuitry to connect to a second containerized router via a virtual router redundancy protocol (VRRP) session; determine, via the VRRP session, that the first containerized router is an active containerized router of the first containerized router and the second containerized router; connect to a virtual private cloud (VPC) gateway; and program, based on the first containerized router being the active containerized router, a VPC route table in the VPC gateway.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
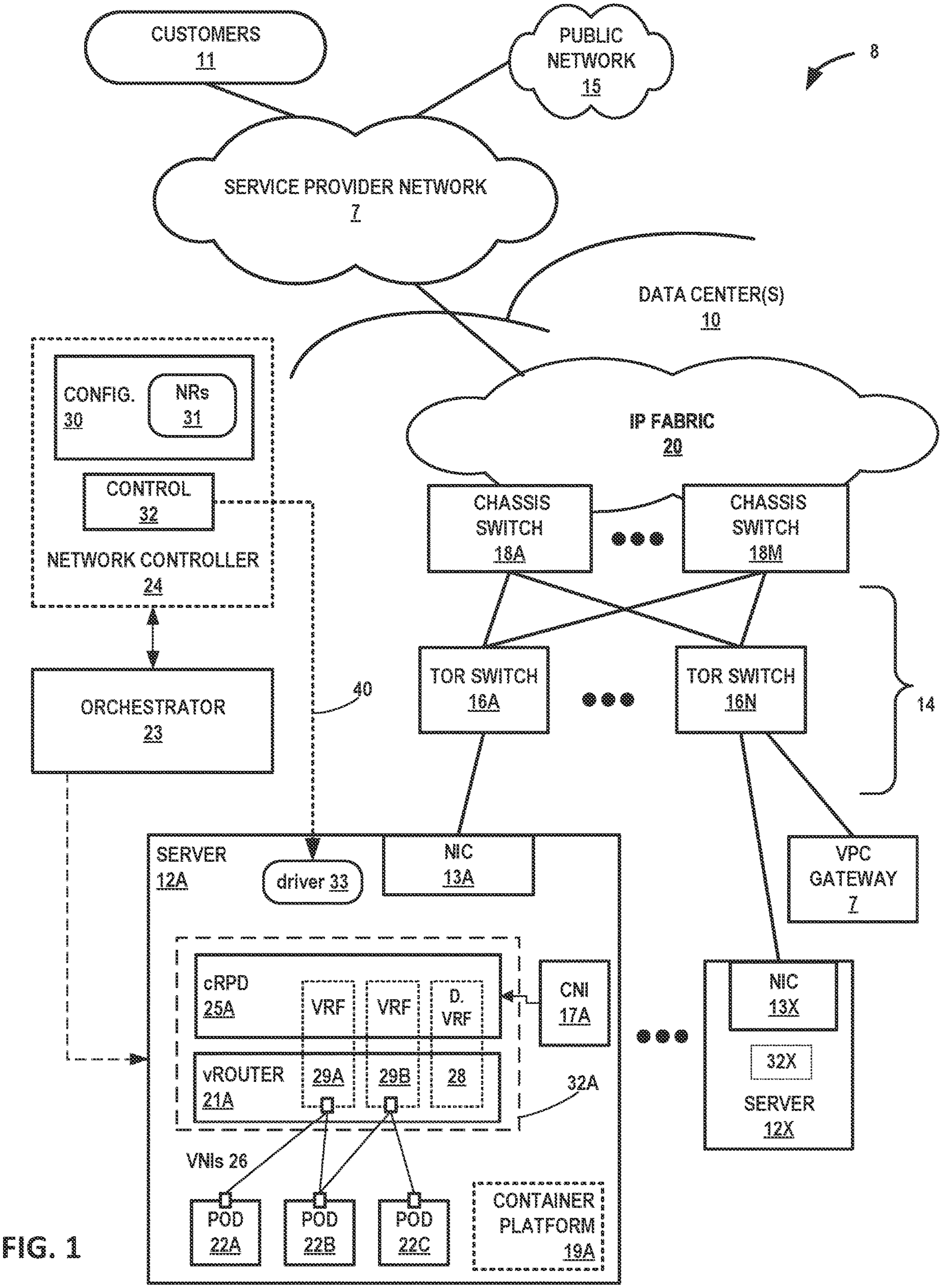
FIG. 1 is a block diagram illustrating an example computing infrastructure according to one or more aspects of this disclosure.

A cloud-native approach may include functional blocks which are decomposed into microservices. The microservices are deployed as containers on compute nodes and orchestrated by an orchestration system, such as Kubernetes (abbreviated as "K8s"). Kubernetes deploys containers using Pods. K8s networking between pods is via plug-ins called Container Networking Interfaces (CNIs) (also known as Container Network Interface plugins). However, the networking capabilities of typical CNIs are rather rudimentary and not suitable when the containerized network functions the CNI serves play a pivotal role within a network, such as a telecommunications network. A CNR, as described herein, provides a better fit for these situations. A CNR is a containerized router that allows a compute node, such as an x86- or ARM-based host, to be a first-class member of the network routing system, participating in protocols such as Intermediate System to Intermediate System (IS-IS) and Border Gateway Protocol (BGP) and providing Multiprotocol Label Switching/Segment Routing (MPLS/SR)-based transport and multi-tenancy. In other words, rather than the platform being an appendage to the network (like a customer edge (CE) router), it may be operating as a provider edge (PE) router or other device within a provider network, such as a in a cloud computing environment.

A CNR may have one or more advantages over a conventional router. A router has a control plane and a forwarding plane. The control plane participates in dynamic routing protocols and exchanges routing information with other routers in the network. It downloads the results into a forwarding plane, in the form of prefixes, next-hops and associated SR/MPLS labels. Implementations described herein are modular, in the sense that the control plane is agnostic to the exact details of how the forwarding plane is implemented. In a hardware router, the forwarding plane may be based on custom ASICs. In contrast, the CNR is a virtualized router. However, the routing protocol software is functionally similar in both cases. This means the CNR benefits from the same highly comprehensive and robust protocol implementation as the hardware-based routers that underpin some of the world's largest networks.

The CNR uses a containerized routing protocol daemon (cRPD) Control Plane and a virtual router (vRouter) forwarding plane to deliver high performance networking in a small footprint, software package that is functionally similar to a non-virtual router, a physical network function (PNF). The forwarding plane may be implemented via a choice of DPDK, Linux Kernel or Smart-NIC. The complete integration delivers a K8s CNI-compliant package, deployable within a K8s environment (e.g., Multus-enabled).

As the CNR is itself a cloud-native application, it supports installation using K8s manifests or Helm Charts. These include the initial configuration of the router, including routing protocols and Layer 3 VPNs to support slices. A CNR may be orchestrated and configured, in a matter of seconds, with all of the routing protocol adjacencies with the rest of the network up and running. Ongoing configuration changes during the lifetime of the CNR, for example to add or remove network slices, may be via a choice of CLI, K8s manifests, NetConf or Terraform.

By adopting a K8s CNI framework, the CNR may mitigate the traditional operational overhead incurred when using a containerized appliance rather than its physical counterpart. By exposing the appropriate device interfaces, the CNR may normalize the operational model of the virtual appliance to the physical appliance, eradicating the barrier to adoption within the operator's network operations environment. The CNR may present a familiar routing appliance look-and-feel to any trained operations team. The CNR has similar features and capabilities, and a similar operational model as a hardware-based platform. Likewise, a domain-controller can use the protocols that it is uses with any other Junos router to communicate with and control the CNR, for example Netconf/OpenConfig, gRPC, Path Computation Element Protocol (PCEP) and Programmable Routing Daemon (pRPD) APIs.

The node executing CNR may participate in IS-IS, Open Shortest Path First (OSPF), BGP, and/or other interior or exterior routing protocols. In addition, MPLS may be used, often based on Segment Routing (SR). The reason for this is two-fold: to allow Traffic Engineering if needed, and to underpin multi-tenancy, by using MPLS-based Layer 3 VPNs. As an alternative, SRv6 could be used instead to fulfill these requirements. Having a comprehensive routing capability is also necessary to implement network slicing. Each slice tenant is placed into its own Layer 3 VPN. The CNR acts as a provider edge (PE) router from the Layer 3 VPN point of view. The CNR therefore exchanges Layer 3 VPN prefixes via BGP with other PE routers in the network, regardless of whether those other PEs are physical routers or CNRs residing on other hosts. Each tenant may be placed in a separate VRF table on each PE, giving the correct degree of isolation and security between tenants, just as with a conventional Layer 3 VPN service. This neatly solves the problem that K8s does not natively provide such isolation. Layer 3 VPN is a tried and tested method for achieving multi-tenancy in networking and is trusted by the many major corporations worldwide who buy this service from their network service providers.

A VPC gateway, which may be deployed and used by a cloud service provider to provide access to a VPC for a customer, may not be capable of using conventional routing protocols, such as BGP, to process routing protocol messages to obtain routing information, such as advertised routes and prefixes. For example, a VPC gateway may not be a BGP speaker. Thus, the VPC gateway may not be natively capable of processing BGP routes and, as a result, may be unable to perform switching or routing of BGP messages or other traffic according to BGP-advertised routes, to or from BGP speaking pods in the data center environment. Because a CNR by contrast is capable of learning BGP routes and switching and routing BGP and other traffic according to BGP-advertised prefixes, it may be desirable to utilize a CNR to program a VPC route table of a VPC gateway such that the VPC gateway may forward traffic via the underlay network to the CNR for further routing. In this way, the CNR directly programs underlay elements of the cloud infrastructure to have the traffic forwarded to the CNR itself for further routing.

FIG. 1 is a block diagram illustrating an example computing infrastructure according to one or more aspects of this disclosure. Computing infrastructure 8 may represent a software-defined networking (SDN) architecture system for virtual networks. Example use cases for the SDN architecture include 5G mobile networks, as well as cloud and enterprise cloud-native use cases. An SDN architecture may include data plane elements implemented in compute nodes (e.g., servers 12) and network devices such as routers or switches, and the SDN architecture may also include an SDN controller (e.g., network controller 24) for creating and managing virtual networks. The SDN architecture including network controller 24 described with respect to FIG. 1 is merely one example. The techniques of this disclosure may apply to other data center architectures and SDN controller deployments and implementations.

In this example, the SDN architecture components are microservices and the SDN architecture assumes a base container orchestration platform to manage the lifecycle of SDN architecture components. The SDN architecture may leverage Kubernetes constructs such as Multus, Authentication & Authorization, Cluster API, KubeFederation, KubeVirt, and Kata containers. The SDN architecture may support data plane development kit (DPDK) pods, and the SDN architecture can extend to support Kubernetes with virtual network policies and global security policies. The SDN architecture may be integrated with orchestration platforms (e.g., orchestrator 23) such as Kubernetes, OpenShift, Mesos, OpenStack, VMware vSphere, and with service provider operations support systems/business support systems (OSS/BSS).

In general, one or more data center(s) 10 provide an operating environment for applications and services for customer sites 11 (illustrated as "customers 11") having one or more customer networks coupled to the data center by service provider network 7, such as through VPCs. In some examples, customer sites 11 may be on-premises (on-prem) customer networks. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of the data center 10.

Data center(s) may provide Virtual Private Clouds (VPCs) to any of customers 11. Data center(s) 10 may include one or more VPC gateways, such as VPC gateway 7, which may be used to connect VPCs to external networks (e.g., on-prem, other clouds, external VPCs) to provide VPC services to customers 11. VPC gateway 7 may be a physical device or a virtual device, such as a physical or virtual gateway, router, switch or the like. In some examples, VPC gateway 7 may be implemented by one or more of servers 12. In some examples, an CNR may be directly coupled to a VPC gateway. VPC gateways are discussed further herein with respect to FIGS. 2 and 3.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to, and extended across, physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual routers 21A-21X (illustrated as and also collectively referred to herein as "vRouters 21"), virtual routers running in servers 12 may create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads. As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). In some examples, packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. Hereinafter, description of virtual routers is made primarily with respect to virtual router 21A, but such description is relevant to other instances of virtual routers 21.

In some examples, for example, for each of the packets outbound from virtual network endpoints hosted by server 12A (e.g., any of pods 22A-22C), virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, virtual router 21A may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21A may be kernel-based and execute as part of the kernel of an operating system of server 12A.

In some examples, virtual router 21A may be a Data Plane Development Kit (DPDK)-enabled virtual router. In such examples, virtual router 21A uses DPDK as a data plane. In this mode, virtual router 21A runs as a user space application that is linked to the DPDK library (not shown). This is a performance version of a virtual router and is commonly used by telecommunications companies, where the VNFs are often DPDK-based applications. The performance of virtual router 21A as a DPDK virtual router can achieve ten times higher throughput than a virtual router operating as a kernel-based virtual router. The physical interface is used by DPDK's poll mode drivers (PMDs) instead of Linux kernel's interrupt-based drivers.

Servers 12 include and execute containerized routing protocol daemons 25A-25X (collectively, "cRPDs 25"). A containerized routing protocol daemon (CRPD) is a routing protocol process that is packaged as a container and may run in Linux-based environments. CRPD may be executed in the user space of the host as a containerized process. Thus, CRPD makes available the rich routing software pedigree of physical routers on Linux-based compute nodes, e.g., servers 12 in some cases. cRPD provides control plane functionality. This control plane is thus containerized. For example, cRPD 25A implements the control plane for a CNR 32A executed by server 12A.

Virtual routers 21, meanwhile, are the software entities that provide data plane functionality on servers 12. cRPD 25A may use the forwarding (or data) plane provided by the Linux kernel of server 12A for a kernel-based virtual router 21A. cRPD 25A may alternatively use a DPDK-enabled or SmartNIC-executed instance of virtual router 21. Virtual router 21A may work with an SDN controller (e.g., network controller 24) to create the overlay network by exchanging routes, configurations, and other data. Virtual router 21A may be containerized. In combination, the containerized cRPD and containerized virtual router may thus be a fully functional containerized, CNR 32A in some examples.

Computing infrastructure 8 implements an automation platform for automating deployment, scaling, and operations of virtual execution elements across servers 12 to provide virtualized infrastructure for executing application workloads and services. In some examples, the platform may be an orchestration system. In some cases, the orchestration system is a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes (a container orchestration system), Docker swarm, Mesos/Marathon, OpenShift, OpenStack, VMware, and Amazon ECS.

Elements of the automation platform of computing infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes. A Kubernetes cluster is an example of an orchestration system cluster.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

Kubernetes operates using a variety of Kubernetes objects-entities which represent a state of a Kubernetes cluster. Kubernetes objects may include any combination of names, namespaces, labels, annotations, field selectors, and recommended labels. For example, a Kubernetes cluster may include one or more "namespace" objects. Each namespace of a Kubernetes cluster is isolated from other namespaces of the Kubernetes cluster. Namespace objects may include at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating the pods with a common set of characteristics. A namespace can be created according to namespace specification data that defines characteristics of the namespace, including a namespace name. In one example, a namespace might be named "Namespace A" and each newly-created pod may be associated with a set of characteristics denoted by "Namespace A." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. Multiple virtual networks may be associated with a single namespace. As such, a pod that belongs to a particular namespace has the ability to access each virtual network of the virtual networks that is associated with the namespace, including other pods that serve as virtual network endpoints of the group of virtual networks.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22. Container platform 19A receives requests from orchestrator 23 to obtain and host, in server 12A, containers. Container platform 19A obtains and executes the containers.

Container network interface (CNI) 17A configures virtual network interfaces for virtual network endpoints. The orchestrator 23 and container platform 19A use CNI 17A to manage networking for pods, including pods 22. For example, CNI 17A creates virtual network interfaces to connect pods 22 to virtual router 21A and enables containers of such pods to communicate, via the virtual network interfaces, to other virtual network endpoints over the virtual networks. CNI 17A may, for example, insert a virtual network interface for a virtual network into the network namespace for containers in pod 22A and configure (or request to configure) the virtual network interface for the virtual network in virtual router 21A such that virtual router 21A is configured to send packets received from the virtual network via the virtual network interface to containers of pod 22A and to send packets received via the virtual network interface from containers of pod 22A on the virtual network. CNI 17A may assign a network address (e.g., a virtual IP address for the virtual network) and may set up routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

CNI 17A may represent a library, a plugin, a module, a runtime, or other executable code for server 12A. CNI 17A may conform, at least in part, to the Container Network Interface (CNI) specification or the rkt Networking Proposal. CNI 17A may represent a Contrail, OpenContrail, Multus, Calico, cRPD, or other CNI. CNI 17A may alternatively be referred to as a network plugin or CNI plugin or CNI instance. Separate CNIs may be invoked by, e.g., a Multus CNI to establish different virtual network interfaces for pod 22.

CNI 17A may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g., a router). Containers can be conceptually added to or removed from one or more networks. The CNI specification specifies a number of considerations for a conforming plugin ("CNI plugin").

By adopting a Kubernetes CNI framework in some examples, CNR 32A may mitigate the traditional operational overhead incurred when using a containerized appliance rather than its physical counterpart. By exposing the appropriate device interfaces, CNR 32A may normalize the operational model of the virtual appliance to the physical appliance, eradicating the barrier to adoption within the operator's network operations environment. CNR 32A (and more specifically the interface to cRPD 25A) may present a familiar routing appliance look-and-feel to any trained operations team. CNR 32A has similar features and capabilities, and a similar operational model as a hardware-based platform. Likewise, a domain-controller can in some cases use the protocols that it uses with any other router to communicate with and control CNR 32A, for example Netconf/OpenConfig, gRPC, Path Computation Element Protocol (PCEP), or other interfaces.

CNR 32A is effectively a virtualized router and may participate in IS-IS, Open Shortest Path First (OSPF), BGP, and/or other interior or exterior routing protocols and exchange routing protocol messages with other routers, whether physical routers or CNRs 32B-32X (CNRs 32A-32X are referred to herein collectively as "CNRs 32") residing on other hosts. In addition, MPLS may be used, often based on Segment Routing (SR). The reason for this is two-fold: to allow Traffic Engineering if needed, and to underpin multi-tenancy, by using VPNs, such as MPLS-based Layer 3 VPNs or EVPNs.

Each of Pods 22 includes one or more containers. In some examples, one or more of pods 22 include a containerized DPDK workload that is designed to use DPDK to accelerate packet processing, e.g., by exchanging data with other components using DPDK libraries. Virtual router 21 may execute as a containerized DPDK workload in some examples.

Pods 22 are each configured with one or more virtual network interfaces (VNIs) 26 for sending and receiving packets with virtual router 21. Virtual network interfaces 26 may be a default interface for pods 22. Pods 22 may implement virtual network interface 26 as an Ethernet interface (e.g., named "eth0") while virtual router 21 may implement virtual network interfaces 26 as tap interfaces, virtio-user interfaces, or other type of interface. Although described with respect to pods, VNIs 26 may be attached to other virtual execution elements such as virtual machines. A virtual network interface may alternatively be referred to as a Virtual Machine Interface (VMI) even if referring to a VNI for a Pod/container.

Pods 22 and virtual router 21 exchange data packets using virtual network interfaces 26. Virtual network interface 26 may be a DPDK interface. Pods 22 and virtual router 21 may set up virtual network interface 26 using vhost. Pods 22 may operate according to an aggregation model. Pods 22 may use a virtual device, such as a virtio device with a vhost-user adapter, for user space container inter-process communication for virtual network interface 26. Description hereinafter is made primarily with respect to pod 22A but can apply to other pods 22 or other virtual execution elements.

CNI 17A may configure, for pod 22A, in conjunction with one or more other components shown in FIG. 1, a virtual network interface 26. Any of the containers of pod 22A may utilize, i.e., share, the virtual network interface(s) 26 of pod 22A.

In some examples, cRPD 25A includes default VRF 28 (illustrated as "D. VRF 28") and VRFs 29A-29B (collectively, "VRFs 29"). Default VRF 28 stores the global routing table. cRPD 25A programs forwarding information derived from routing tables of VRFs 29 as forwarding tables into virtual router 21A. In this way, virtual router 21A implements the VPNs for VRFs 29, which are illustrated as included in both virtual router 21A and cRPD 25A.

In some examples, cRPD 25A is configured to operate in host network mode, also referred to as native networking. cRPD 25A therefore uses the network namespace and IP address(es) of its host, i.e., server 12A. cRPD 25A has visibility and access to network interfaces 30A-30B of NIC 13A, which are inserted into default VRF 28 and considered by CRPD 25A as core-facing interfaces. Interfaces 30A-30B are connected to switch fabric 14 and may be Ethernet interfaces. Interfaces 30 are considered and used as core-facing interfaces by cRPD 25A for providing VPNs, for interfaces 30 may be used to transport VPN service traffic over a layer 3 network made up of one or more of switch fabric 14, IP fabric 20, service provider network 7, or public network 15.

In the example server 12A of FIG. 1, pods 22 are virtual network endpoints in one or more virtual networks. Orchestrator 23 may store or otherwise manage configuration data for application deployments that specifies a virtual network and specifies that a pod 22 (or the one or more containers therein) is a virtual network endpoint of the virtual network. Orchestrator 23 may receive the configuration data from a user, operator/administrator, or other machine system, for instance.

As part of the process of creating pod 22A, for instance, orchestrator 23 requests that network controller 24 create respective virtual network interfaces for one or more virtual networks (indicated in the configuration data). Pod 22A may have a different virtual network interface for each virtual network to which it belongs. For example, virtual network interface 26 may be a virtual network interface for a particular virtual network. Additional virtual network interfaces (not shown) may be configured for other virtual networks. Network controller 24 processes the request to generate interface configuration data for virtual network interfaces for the pod 22A. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

In some examples, a Pod can have multiple interfaces to different CRPD VRFs 29, e.g., one for management traffic, another for data traffic. In FIG. 1, pod 22B may use VRF 29B for management traffic and VRF 29A for data traffic, for instance.

A pod 22, e.g., pod 22A, might be connected to some physical interfaces where pod 22 learns IP addresses of other devices, such as User Equipment where the pod is implementing a mobile network gateway or a customer network subnet where the pod is implementing a CE router or gateway. In some examples, to advertise these IP addresses into the network, pod 22A treats the virtual network interface 26 with a VRF 29 as an IP link and advertises routes for these IP addresses to cRPD 25A. CRPD 25A can then advertise reachability for these IP addresses through cRPD 25A and pod 22A as a next hop, again conforming to a VPN service model. cRPD 25A programs virtual router 21 with corresponding forwarding information derived from the VRFs 29 and default VRF 28, and virtual router 21 forwarding VPN traffic according to the VPN service model to implement the VPNs.

CRPD 25A may apply many different types of overlay networks/VPNs, including L3VPN or EVPN (Type-2/Type-5), using a variety of underlay tunneling types, including MPLS, SR-MPLS, SRv6, MPLSoUDP, MPLSoGRE, or IP-in-IP, for example.

CNI 17A may configure, for pod 22*s*, in conjunction with one or more other components shown in FIG. 1, virtual network interfaces 26. Any of the containers of a pod 22 may utilize, i.e., share, any virtual network interface of the pod. Orchestrator 23 may store or otherwise manage virtual network interface configuration data for application deployments. Orchestrator 23 may receive specification for containerized applications ("pod specifications" in the context of Kubernetes) and network attachment definitions from a user, operator/administrator, or other machine system, for instance, and network controller 24 may derive the configuration data from this information for configuring VRFs 29 and default VRF 28; and configuring virtual network interfaces 26.

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

In the example computing infrastructure of FIG. 1, Network controller 24 is a cloud-native, distributed network controller for SDN that is implemented using one or more configuration nodes 30 and one or more control nodes 32. Each of configuration nodes 30 may itself be implemented using one or more cloud-native, component microservices. Each of control nodes 32 may itself be implemented using one or more cloud-native, component microservices.

Network controller 24 may be multi-tenant aware and support multi-tenancy for orchestration platforms. For example, network controller 24 may support Kubernetes Role Based Access Control (RBAC) constructs, local identity access management (IAM) and external IAM integrations. Network controller 24 may also support Kubernetes-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers 21) network policies, referred to as Virtual Network Policy (VNP) and alternatively referred to herein as Virtual Network Router or Virtual Network Topology. The VNP defines connectivity policy between virtual networks. A single network controller 24 may support multiple Kubernetes clusters, and VNP thus allows connecting multiple virtual networks in a namespace, Kubernetes cluster and across Kubernetes clusters. VNP may also extend to support virtual network connectivity across multiple instances of network controller 24.

Network controller 24 may enable multi layers of security using network policies. The Kubernetes default behavior is for pods to communicate with one another. In order to apply network security policies, the SDN architecture implemented by network controller 24 and virtual router 21 may operate as a CNI for Kubernetes through CNI 17A. For layer 3, isolation occurs at the network level and virtual networks operate at L3. Virtual networks are connected by policy. The Kubernetes native network policy provides security at layer 4. The SDN architecture may support Kubernetes network policies. Kubernetes network policy operates at the Kubernetes namespace boundary. The SDN architecture may add custom resources for enhanced network policies. The SDN architecture may support application-based security. (These security policies can in some cases be based upon metatags to apply granular security policy in an extensible manner.) For layer 4+, the SDN architecture may in some examples support integration with containerized security devices and/or Istio and may provide encryption support.

CNRs, such as CNR 32A, are described in further detail in U.S. Patent Publication 2022-0279420 A1, published on Sep. 1, 2022, entitled "CONTAINERIZED ROUTER WITH VIRTUAL NETWORKING", which is incorporated herein by reference in its entirety.

According to the techniques of this disclosure, a containerized router operating within a public cloud environment may provide routing control plane functionality for VPC workloads reachable via VPC gateways. The containerized router may execute a routing protocol to learn routes associated with the VPC workloads and may program a VPC route table in a VPC gateway device to cause the VPC gateway device to route traffic towards the containerized router for further routing. Such traffic may include traffic from one or more containers (also referred to as pods). Such an arrangement may be beneficial as the pods and on-prem routers may include border gateway protocol (BGP) speakers, but the VPC gateway may not be BGP-enabled and therefore unable to process BGP advertisements or BGP-advertised routing information to determine how to route overlay traffic sourced by or destined to workloads in a VPC, such as BGP traffic.

According to the techniques of this disclosure, redundant containerized routers may be used in a public cloud environment. The redundant containerized routers may connect with each other, for example, via a virtual router redundancy protocol (VRRP) session. A first containerized router of the redundant containerized routers may determine, via the VRRP session, that the first containerized router is an active containerized router. The first containerized router may connect to a VPC gateway and program a VPC route table in a VPC gateway.

Figure 2:
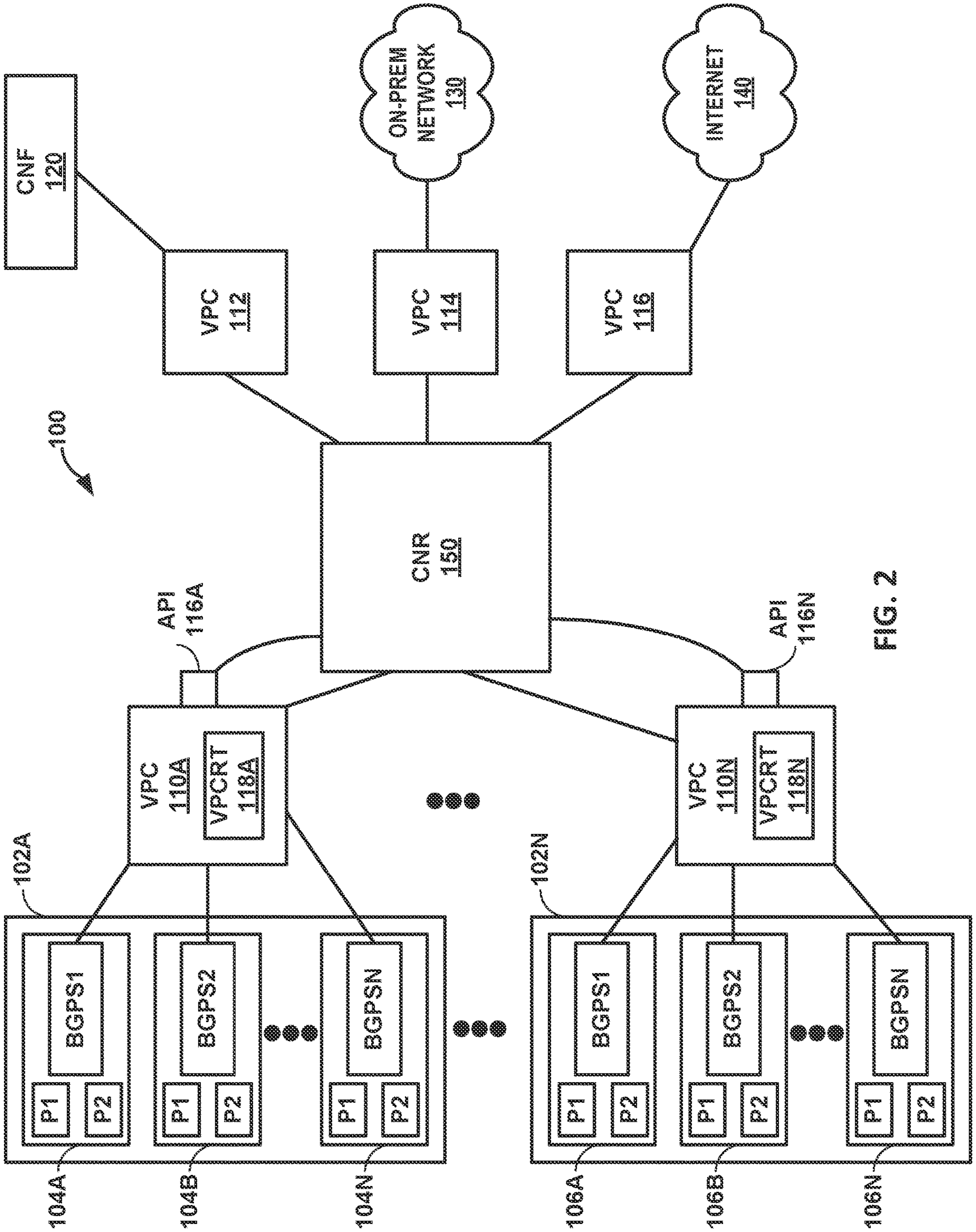
FIG. 2 is a block diagram of an example cloud computing environment including a CNR which programs VPC route tables for VPC gateways according to one or more aspects of this disclosure.

FIG. 2 is a block diagram of an example cloud computing environment including a CNR which programs VPC route tables for VPC gateways according to one or more aspects of this disclosure. Cloud computing environment 100 may be an example of one or more of data center(s) 10 of FIG. 1. Cloud computing environment 100 may be configured to provide VPC services to customers of an operator of cloud computing environment 100. A VPC may operate as an extension of an on-prem network (e.g., on-prem network 130) of a customer of the operator of cloud computing environment 100 or operate as a virtual network that is similar to a traditional (or physical) network of the customer of the operator of cloud computing environment 100. A VPC may include one of more subnets, each with its own range of IP addresses, and one or more gateways, which may be referred to herein as VPC gateways. A gateway may be a device (physical or virtual) that connects a VPC to other networks. For example, an Internet gateway (e.g., VPC gateway 116) may connect a VPC to Internet 140.

Cloud computing environment 100 may include CNR 150, VPC gateways 110A-110N (collectively VPC gateways 110) which may provide access to clusters 102A-102N (collectively clusters 102). VPC gateways 110 may be examples of VPC gateway 7 of FIG. 1. Cluster 102A may include a plurality of worker (compute) nodes 104A-104N, which may include Kubernetes worker nodes. Similarly, cluster 102N may include a plurality of worker nodes 106A-106N. Each of worker nodes 104A-104N and worker nodes 106A-106N may include, BGP speakers (e.g., BGPS1-BGPSN) and one or more pods, such as pods P1 and P2. In some examples, pods P1 and pods P2 may not be BGP enabled. As shown in FIG. 2, pods P1 represent pods of a first service and pods P2 represent pods of a second service. Pods P1 and P2 may be a part of a same subnet or a different subnet. Each service may have a unique IP address, which may be a virtual IP or service IP. IP addresses for pods P1 may be drawn from the service subnet for the first service.

A given worker node may include pods for one or more services. Clusters 102 may represent clusters of a VPC which may be executing as an extension of another network, such as on-prem network 130.

BGP speakers BGPS1-BGPSN, which map be pods, such as pods of cluster 102A, may know or become aware of the IP addresses associated with pods P1 and P2. In some examples, BGP speakers BGPS1-BGPSN may be a part of a CNI which allocates IP addresses to pods P1 and P2, and would therefore know the IP addresses of pods P1 and P2. In some examples, BGP speakers BGPS1-BGPSN may learn the IP addresses, for example, through interactions with Kubernetes elements and may advertise such IP addresses via a data protocol, such as BGP. However, as described in further detail below, VPC gateways 110 may be incapable of processing routing protocol (e.g., BGP) messages from BGP speakers BGPS1-BGPSN and therefore unable to learn routes to pods P1 or P2.

Cloud computing environment 100 may also include VPC gateway 112, VPC gateway 114, and VPC gateway 116. VPC gateway 112 may provide access to cloud-native network function (CNF) 120. CNF 120 may be a software service that provides network functions to cloud computing environment 100. In some examples, CNF 120 may be implemented via pods or containers. VPC gateway 114 may provide access to on-prem network 130, and VPC gateway 116 which may provide access to Internet 140. While not shown in FIG. 2, cloud computing environment 100 may include additional devices (which may be physical or virtual) which may be used to access or interact with other networks or network devices, not included in FIG. 2, such as additional on-prem networks. VPC gateway 116 may function as an Internet gateway, providing access to Internet 140 to the various clusters 102 of cloud computing environment 100. VPC gateway 114 may function as a gateway to on-prem network 130 providing access between on-prem network 130 and cluster(s) 102 of a VPC of on-prem network 130. In some examples, each of clusters 102, VPCs 110, and CNR 150 may function as layer 3 routers, such that no tunneling is needed between these devices. For example, CNR 150 may employ MAC learning to direct traffic from, for example, on-prem network 130 to clusters 102.

While cloud computing environment 100 may have VPCs including VPC gateways 110, such VPC gateways may offer limited functionality due to limitations of underlying hardware platforms (e.g., in terms of scale, functionality, or the like) or software implementations (e.g., in terms of equal-cost multipath routing (ECMP), overlays, signaling, protocols, or the like), scale (e.g., in terms of a limited number of routes, tables/instances, number of protocol sessions such as BGP, or the like) for workloads deployed on those environments. In some examples, VPC gateways 110 may not operate using conventional routing protocols and/or may require use of custom APIs and non-portable protocols. For example, the devices of cloud environment 100 may not be able to use any standard protocols to speak with VPC gateways 110. VPC gateways 110 may not be aware of IP addresses to on-prem network 130. As such, BGP speakers, such as BGPS1 of workload 104A may be unable to advertise workload 104A or pods P1 and P2 of workload 104A to VPC gateway 110A.

To address this issue, CNR 150 may use APIs to program VPC route tables 118 of VPC gateways 110. Such programming may not introduce new tunneling between VPCs 110 and CNR 150, but instead instruct VPC gateways 110 how to forward packets (e.g., towards workloads 104 and 106) using a same IP header information as used by CNR 150. In some respects, CNR 150 may treat VPC gateways 110 as forwarding planes-instructing VPC gateways 110 how to forward packets from different routes learned by CNR 150 via routing protocol messages advertised, e.g., by BGPS1-BGPSN of clusters 102. In such respects, CNR 150 may be viewed as a control plane for VPC gateways 110, as CNR 150 may program VPC route tables 118 of VPCs 110. When programing VPC route tables 118, CNR 150 may use a policy engine of cRPD 25A (FIG. 1) and apply a different route policy for each VPC route table.

For example, CNR 150 may utilize a routing policy as a filter to affect routing of packets. The routing policy may be based on both a source address and a destination address. As such, packets may be routed within an appropriate VPN, e.g., of a VPC, such as in the case where on-prem network 130 includes multiple tenants.

In some examples, CNR 150 abstracts and hides all the VPC network details from the hosted services, while also making the solution portable across different cloud environments and as well provide easy migration to on-prem environments. CNR 150 may provide this either by using network overlays or by directly interacting with cloud network elements.

For example, CNR 150 may interact with the cloud environment underlay, learning underlay network topology and then distribute routes into the underlay to provide seamless connectivity between applications deployed in the cloud environment and on-prem or another cloud environment (e.g., a Hybrid Cloud).

For example, CNR 150 may dynamically establish (BGP) routing adjacencies on worker nodes or pods and distribute routing information into the cloud environment underlay and/or advertise to remote BGP peers. These prefixes are not (automatically) learned by VPC gateways 110, but are needed, in some cases, to enable traffic forwarding, for example, from VPC gateways 110 to, for example, on-prem network 130.

When an IP router is deployed in cloud environment having VPCs, for most scenarios it may not be able to provide routing because such cloud environments have their own Layer-3 based network (underlay) VPC infrastructure which prevents establishing routing adjacencies using protocols such as IS-IS, OSPF due to lack of support for multicast and broadcast traffic. This disclosure describes a CNR that provides routing functionality in a cloud environment having one or more VPCs. While shown separately, in some examples, CNR 150 may be implemented in a cluster of clusters 102.

In the example of FIG. 2, CNR 150 programs VPC route tables 118 (illustrated as VPCRT 118A-118N in FIG. 1) such that VPCs gateways 110 forward traffic to CNR 150, whereas a standard router would simply program its own forwarding information base (FIB) to forward incoming traffic away from itself. As CNR 150 may learn routes to, e.g., on-prem network 130, CNR may then route traffic destined to on-prem network 130 from VPC gateways 110 to on-prem network 130 after receiving the traffic from VPC gateways 110.

CNR 150 may program VPC route tables 118 of VPCs 110 using an API of VPC(s) 110. CNR 150 may program a plurality of VPC tables 118, each having a respective (e.g., different) set of routes and next-hops. In some examples, CNR 150 may map cRPD routes and interfaces to VPC route tables 118 and interfaces based on operator defined tags. In some examples, an operator may define route tables, next-hops, route selection criteria, or the like, through route policies, which may be applied by CNR 150. An administrator could alternatively statically program the VPC route tables, but such a practice is not scalable and does not take advantage of the high scalability of a VPC for a customer.

For example, a VPC route table (e.g., VPC route table 118A) may include an indication that for a particular IP address, the next-hop IP address should be zero or a worker node (e.g., worker node 104A). cRPD 25A may use an interface ID, for example a virtual network interface on a VPC gateway and an interface name on CNR 150.

VPCs 110 may know the IP addresses of worker nodes 104 and 106, but not know the IP addresses assigned to the application pods (e.g., P1 and P2) within the worker nodes 104 and 106. For example, VPCs 110 may not know how to deliver packets from pods P1 and P2 to on-prem network 130 or vice versa.

An administrator may determine different route policies to be used by CNR 150 to program each of VPC route tables 118. For example, a policy may be used to determine which routes to program into a VPC route table. As such, a policy may act as a filter, such that a given VPC route table (e.g., VPC route table 118A) may include a subset of available routes.

In some examples, there may be overlap in destination IP addresses between different intended destinations. In such a case, using policy-based routing, CNR 150 may use both a source IP address and a destination IP address to categorize a packet into different VPNs to route packets from all pods sharing a same interface and delivering packets to same VPC such that packets meant for on-prem network 130 are sent to VPC 114 and not a VPC associated with another on-prem network.

In some examples, a BGP speaker may be a CNI that assigns pod IP addresses so the BGP speaker (e.g., BGPS1) knows the IP addresses for the associated pods (P1 and P2 of worker node 104A). In some examples, a BGP speaker may be a plug-in.

Some wireless service providers, when expanding their existing infrastructure to accommodate 5G, may desire to move some of their core network into the public cloud. For example, 5G's cloud native core functions like unified data management (UDM), network slice selection function (NSSF), and network repository function (NRF) can be containerized, and moved into the public cloud. Because wireless service providers may provide slicing functions and offer slices on the basis of factors like functionality, performance, User Equipment (UE) groups, etc., these CNFs should be elastically scaled up or down in a public cloud environment dynamically using load balancer services. Service providers also can take the advantage of the inherent redundancy capabilities provided by the public cloud and so distribute their functions across different geographical zones in an active-standby mode. Service providers expect seamless connectivity, low latency, and high throughput from their on-prem data center to the core functions running in the cloud. A major requirement for service providers having geographically distributed networks may be seamless switchover in case of natural calamities/failures to a different geographical zone. Traditional public cloud offerings may not support the network services required for such a use case. As such, it may be desirable to provide a cloud native software router to address these requirements.

CNR 150 may utilize a DPDK vrouter, as its dataplane to accelerate the packets processed per second (PPS) to deliver the required packet performance in cloud environments.

CNR 150 may be used to extend a 5G core infrastructure running on-premises (e.g., on-prem network 130) to, for example, VPC 110A. In the 5G example, different services like NSSF, NRF and UDM, each with their own service IP addresses, may be run in an EKS cluster (e.g., cluster 102A), each in their own VRFs (For example, SIG VRF, OAM VRF), and CNR 150 may provide seamless communication with the VRF counterparts like CUs running in on-prem network 130, for example, with full isolation. Cluster 102A may include a node group with autoscaling of maximum and minimum size as 2, for example. The 5G CNF pods and CNR 150 may be run in different clusters. For example, the 5G CNF pods may be run in cluster 102A while CNR 150 may be run in another cluster of clusters 102A-102N. The service IP addresses may be cluster endpoints accessible only inside a VPC. Cluster networking may be provided by a cloud service provider VPC container networking interface (CNI) plugin. The CNI plugin allows the Kubernetes pods to have a same IP address as the Kubernetes pods have on the VPC network. All containers inside the pod that share a network namespace can communicate with each other using ports.

To attract traffic from these 5G CNFs and on-premises CNFs, CNR 150 may, via VPC APIs, program the internal and external VPC route tables. For example, CNR 150 may include a full BGP stack by which, CNR 150 peers with the 5G CNFs, a transit gateway (TGW) (shown in FIG. 3), and any on-premises edge gateway running in cloud computing environment 100 to exchange routes. The 5G CNFs may have BGP capability to advertise the associated service virtual IP addresses towards CNR 150. In some examples, CNR 150 includes a BGP auto-configuration function where CNR 150 automatically sets up BGP sessions when a new CNF workload is orchestrated.

As discussed above, routes in VPC route tables 118 are programmed by a CNR, such as CNR 150, such that the VPC gateways 110 forward traffic towards the CNR. In a deployment with a single CNR 150, a failure of CNR 150 will disrupt traffic to/from services hosted on worker nodes in a cluster. Traffic disruption could be temporary or transient. Running two instances of CNR in an active/standby mode may significantly minimize the traffic disruption by improving recovery time.

Figure 3:
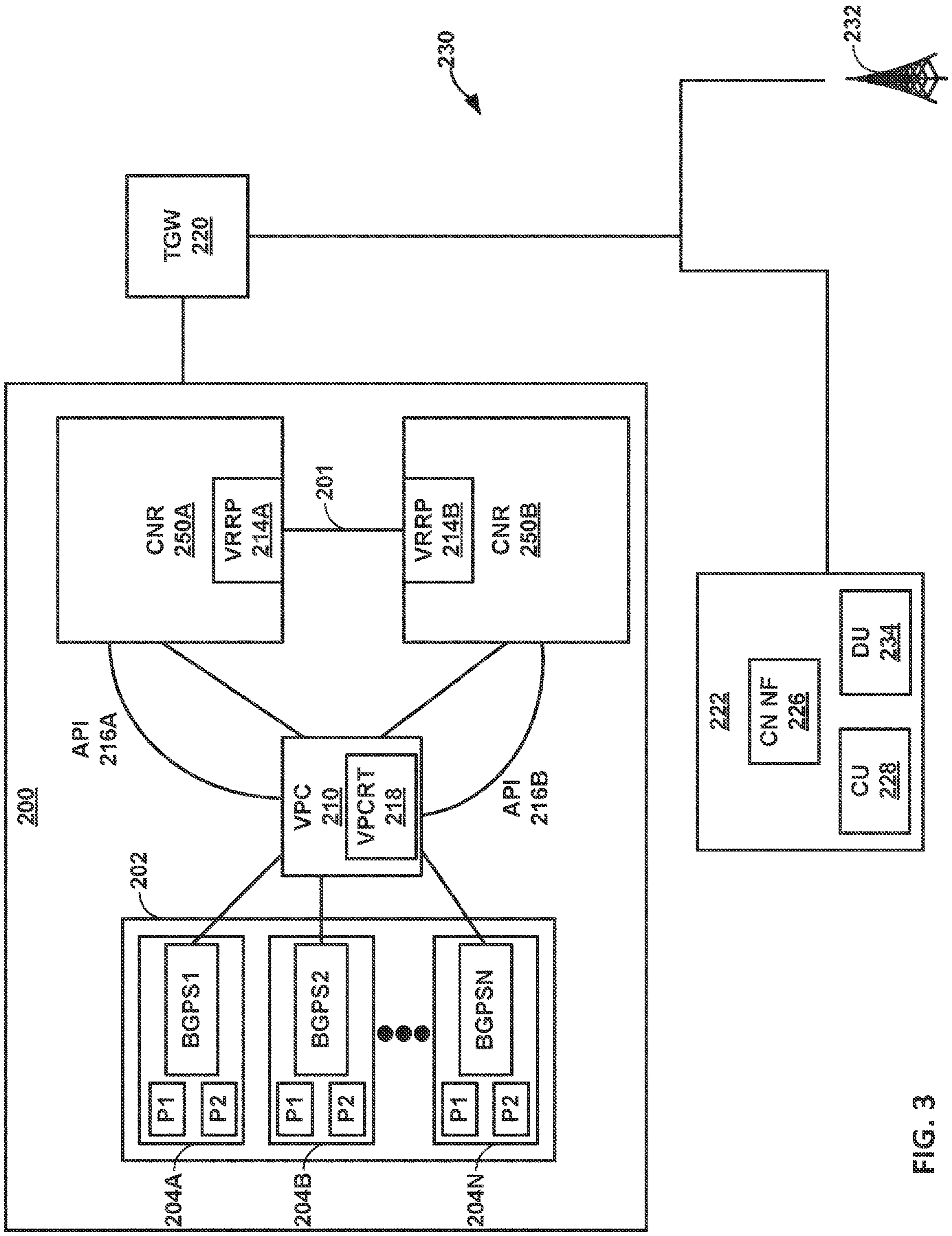
FIG. 3 is a block diagram of an example cloud computing environment having redundant CNRs according to one or more aspects of this disclosure.

FIG. 3 is a block diagram of an example cloud computing environment having redundant CNRs according to one or more aspects of this disclosure. Cloud computing environment 200 may be similar to cloud computing environment 100, but include redundant CNRs (CNR 250A and CNR 250B), which may be examples of CNR 150 of FIG. 2. In the example of FIG. 3, cloud computing environment 200 is shown coupled to an on-prem network 330, which may be an example of on-prem network 130 of FIG. 2. On-prem network 330 may be a wireless wide area network, such as a 5G network.

CNR 250A and CNR 250B may include virtual router redundancy protocol (VRRP) components 214A and 214B, respectively, which may be operable to establish a VRRP session 201 between CNR 250A and CNR 250B. In some examples, one or more of VRRP components 214A or 214B may be implemented as a pod, such as pods P1 or P2. To determine which of CNR 250A and CNR 250B should be the active node and which should be the standby node, CNR 250A and CNR 250B may run VRRP session 201. VRRP is a protocol which may be used to provide redundancy in a network. VRRP session 201 may elect one of CNR 250A or CNR 250B as an active node (sometimes referred to as a master node) and the other of CNR 250A or CNR 250B as a standby node (sometimes referred to as a backup node). The active CNR is responsible for operating as a CNR, similar to CNR 150 of FIG. 2, while the standby CNR remains available for assuming the functions of the active CNR should an issue occur with the active CNR or links thereto which prevent the active CNR from operating as intended. In some examples, VRRP session 201 may include a unicast VRRP session. Private cloud environments having VPCs, may not support L2-based VRRP, as they may not support IP broadcast and/or multicast traffic. As such VRRP session 201 may be a unicast VRRP session.

In some examples, CNR 250A and CNR 250B may share a virtual IP address on the interfaces facing worker nodes 204 (e.g., the interface with VPC 210). In some examples, the shared virtual IP address will only be used by the active node of CNR 250A and CNR 250B. The active node may forward traffic to/from worker nodes 204, while the standby node may not. Additionally, the active node may update VPC route table 218, which the standby may not. In this manner, VPCs interfacing with CNR 250A and CNR 250B (e.g., VPC 210) may only forward traffic to the active node.

The active CNR node may have an L2 MAC address which may be different than an L2 MAC address of the standby CNR node. The active CNR node may advertise the L2 MAC address of the active CNR node, while the standby CNR node may not advertise the L2 MAC address of the standby CNR node. For example, if CNR 250A is the active node, CNR 250A may advertise the L2 MAC address for CNR 250A, while the standby node, CNR 250B, may not advertise the L2 MAC address for CNR 250B.

For example, CNR 250A may continue operating as the active node and CNR 250B as the standby node until a failure of CNR 250A is detected. When the failure of CNR 250A is detected via VRRP 201, CNR 250B (the standby node) will become the active node. In such a case, in order to continue attracting traffic to the active node (which has now changed from CNR 250A to CNR 250B), CNR 250B may learn routes from neighboring devices and a routing agent application of CNR 250B may update VPC route table 218 to update the forwarding next-hop to be CNR 250B (rather than CNR 250A), and a routing agent application of CNR 250A may cease updating VPC route table 218. As such, traffic from the pods of workers 204 may be forwarded by VPC 210 to CNR 250B, the new active node. For example, in an L2 based network segment, CNR 250B may use gratuitous ARP to update an ARP entry corresponding to the virtual IP address such that traffic is now forwarded to the CNR 250B, the new active VRRP master.

CNR 250B may begin advertising CNR 250B's L2 MAC address, while CNR 250A may cease advertising CNR 250A's L2 MAC address. In this manner, traffic from, for example, TGW 220, may be directed to CNR 250B, rather than CNR 250A.

In some examples, VRRP mastership status may be used to modify a BGP route attribute, such as local-preference (local-pref) (I-BGP) or multi exit discriminator (MED) (e-BGP), such that a remote, on-prem device (virtual or physical), such as a BGP peer, would prefer CNR 250B (the VRRP active node), as an egress PE, over CNR 250A.

Upstream routers, such as TGW 220, may have a virtual IP address which may be used as forwarding next hop IP address by the active CNR. In some examples, both CNR 250A and CNR 250B (both the active node and the standby node) advertise BGP prefixes to on-prem network 330 to establish BGP sessions with BGP peers in on-prem network 330. In some examples, BGP speakers (BGPS1-BGPSN) of worker nodes 204 advertise BGP prefixes to both CNR 250A and CNR 250B.

In some examples, worker nodes 204 may use the virtual IP address shared by CNR 250A and CNR 250B as the default route if the virtual IP address is in a same subnet as worker node. This approach would result in fewer updates to VPC route table 218, but would require the active VRRP node to acquire the virtual IP address from the VPC infrastructure. In such an example, the virtual IP address should be known to all the worker nodes.

In the example of FIG. 3, worker nodes 204 are part of cluster 302 which may host 5G Core network functions (CNFs), such as NSSF, UDM, or the like, for a service provider associated with on-prem network 330. Each of these CNFs may have their own virtual IP address. In some examples, these services may be operated in different virtual routing and forwarding functions (VRFs) and include traffic isolation between such services. For example, there may be a virtual IP address for an operations, administration and maintenance (OAM) VRF (10.10.10.10/32) and another virtual IP address for a secure Internet gateway (SIG) VRF (10.10.11.10/32). Each worker of worker nodes 204 may have a BGP speaker of BGPS1-BGPsN, which may be used to peer with an active CNR of CNRs 250A and 250B, and advertise the virtual IP addresses.

In some examples, CNRs 250A and 250B may run on a cluster (not shown in FIG. 3), such as cluster 102N (FIG. 2). For example, such a cluster may have an auto-scale size of 2. One of CNRs 250A or 250B may be in an active mode, while the other of CNRs 250A or 250B may be in a standby mode to provide redundancy for the functions of the active CNR. In some examples, CNR 250A and CNR 250B may each be located in a different geography (such as where cloud computing environment 200 is a geographically dispersed cloud computing environment) to provide geographic redundancy. CNRs 250A and 250B may peer with TGW 220 to reach on-prem network 330, which may include a telecommunications data center 322, where core network, network function (CN NF 226), centralized unit (CU) 228, and/or distributed unit (DU) 234 may be located. It should be understood that on-prem network 330 may also include cellular radio/antenna 332.

In the example of FIG. 3, the active CNR may support multiple interfaces (e.g., up to 8) and can route traffic between these interfaces. For example, an Ethernet interface in CNR 250A and/or CNR 250B may be used to send traffic like http, https, or the like, towards worker nodes 204 for all the virtual IP addresses.

In some examples, CNR 250A and CNR 250B may include BGP auto-configuration, such that no new configuration needs to be added when new BGP speakers are spun up, such as BGPSN. In some examples, CNR 250A and CNR 250B may include bidirectional forwarding detection (BFD), which may be used to detect sub-second failures with respect to 5G workloads of worker nodes 204, and to re-route traffic. In some examples, CNR 250A and CNR 250B may utilize VRF-lite. For example, virtual routing domains with route leaking may be configured to route traffic across different VRFs. For example, prefixes in a SIG VRF and an OAM VRF may be leaked in an Ethernet interface. In some examples, CNR 250A and CNR 250B may support equal-cost multi-path (ECMP) routing. For example, new workers (e.g., worker node 104N) can be added or deleted on the fly without impacting existing flows. This may be referred to as flow affinity or flow stickiness. In some examples, CNR 250A and CNR 250B may be configured to interact with VPC gateway 210 via APIs, such as API 216A and 216B, which are programmed to populate external and internal routing tables (e.g., route table 218)

based on BGP advertisements (e.g., from BGP speakers BGPS1-BGPSN) to attract traffic towards an active one of CNR 250A or CNR 250B.

In some examples, CNR 250A and CNR 250B may provide for asymmetric routing. For optimization purposes and cost saving, there may be some flows from the active CNR towards worker nodes 204, but the reverse flows from worker nodes 204 may be routed directly from VPC gateway 210. In some examples, to support the active-standby switchover between CNR 250A and CNR 250B, CNR 250A and CNR 250B may use one or more protocols, like VRRP. In some examples, because most of public clouds do not support multicast or broadcast, CNR 250A and CNR 250B may use unicast VRRP. In some examples, CNR 250A and CNR 250B may support tunnels, such as MPLS-over-UDP tunnels (MPLSoUDP). For example, CNR 250A and CNR 250B may utilize MPLSoUDP encapsulation to tunnel the traffic towards on-prem network 330. In some examples, CNR 250A and CNR 250B may provide control plane features, such as EVPN-VXLAN.

Figure 4:
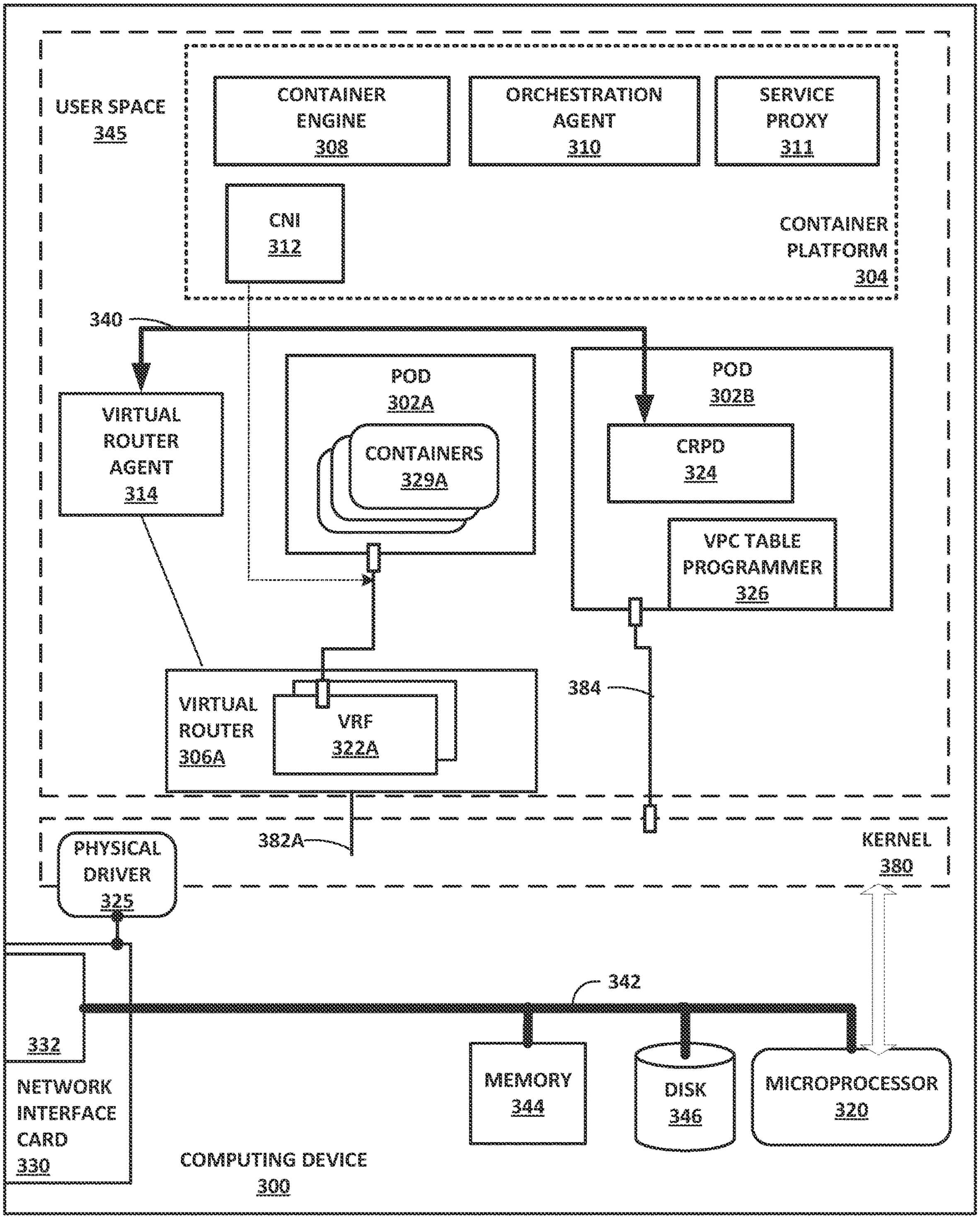
FIG. 4 is a block diagram of an example computing device (e.g., host), according to techniques described in this disclosure.

FIG. 4 is a block diagram of an example computing device (e.g., host), according to techniques described in this disclosure. Computing device 300 of FIG. 4 may represent a physical or virtual server and may represent an example instance of any of servers 12 of FIG. 1. Computing device 300 includes in this example, a bus 342 coupling hardware components of a computing device 300 hardware environment. Bus 342 couples network interface card (NIC) 330, storage disk 346, and one or more microprocessors 210 (hereinafter, "microprocessor 320"). NIC 330 may be SR-IOV-capable. A front-side bus may in some cases couple microprocessor 320 and memory device 344. In some examples, bus 342 may couple memory device 344, microprocessor 320, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 320 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 320.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 320 may provide an operating environment for a software stack that includes an operating system kernel 380 executing in kernel space. Kernel 380 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 380 provides an execution environment for one or more processes in user space 345.

Kernel 380 includes a physical driver 325 to use the network interface card 330. Network interface card 330 may also implement SR-IOV to enable sharing the physical network function (I/O) among one or more virtual execution elements, such as containers 329A-329B or one or more virtual machines (not shown in FIG. 2). Shared virtual devices such as virtual functions may provide dedicated resources such that each of the virtual execution elements may access dedicated resources of NIC 330, which therefore appears to each of the virtual execution elements as a dedicated NIC. Virtual functions may represent lightweight PCIe functions that share physical resources with a physical function used by physical driver 325 and with other virtual functions. For an SR-IOV-capable NIC 330, NIC 330 may have thousands of available virtual functions according to the SR-IOV standard, but for I/O-intensive applications the number of configured virtual functions is typically much smaller.

Computing device 300 may be coupled to a physical network switch fabric that includes an overlay network that extends switch fabric from physical switches to software or "virtual" routers of physical servers coupled to the switch fabric, including virtual router 306A. Virtual routers may be processes or threads, or a component thereof, executed by the physical servers, e.g., servers 12 of FIG. 1, that dynamically create and manage one or more virtual networks, which may include VPCs, usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 300 of FIG. 4, virtual router 306A executes within user space as a virtual router, but virtual router 306A may execute within a hypervisor, a host operating system, a host application, or a virtual machine in various implementations.

Virtual router 306A may replace and subsume the virtual routing/bridging functionality of the Linux bridge/OVS module that is commonly used for Kubernetes deployments of pods 302. Virtual router 306A may perform bridging (e.g., E-VPN) and routing (e.g., L3VPN, IP-VPNs) for virtual networks. Virtual router 306A may perform networking services such as applying security policies, NAT, multicast, mirroring, and load balancing. In some examples, virtual router 306A may perform routing of packets to/from one or more VPCs, such as any of VPC 110 of FIG. 2.

Virtual router 306A can be executing as a kernel module or as a user space DPDK process (virtual router 306A is shown here in user space 345). Virtual router agent 314 may also be executing in user space. In the example computing device 300 of FIG. 4, virtual router 306A executes within user space as a DPDK-based virtual router, but virtual router 306A may execute within a hypervisor, a host operating system, a host application, or a virtual machine in various implementations. In some examples, virtual router agent 314 has a connection to network controller 24 using a channel, which is used to download configurations and forwarding information. Virtual router agent 314 programs this forwarding state to the virtual router data (or "forwarding") plane represented by virtual router 306A. Virtual router 306A and virtual router agent 314 may be processes.

Virtual router 306A may replace and subsume the virtual routing/bridging functionality of the Linux bridge/OVS module that is commonly used for Kubernetes deployments of pods 302. Virtual router 306A may perform bridging (e.g., E-VPN) and routing (e.g., L3VPN, IP-VPNs) for virtual networks. Virtual router 306A may perform networking services such as applying security policies, NAT, multicast, mirroring, and load balancing.

Virtual router 306A may be multi-threaded and execute on one or more processor cores. Virtual router 306A may include multiple queues. Virtual router 306A may implement a packet processing pipeline. The pipeline can be stitched by the virtual router agent 314 from the simplest to the most complicated manner depending on the operations to be applied to a packet. Virtual router 306A may maintain multiple instances of forwarding bases. Virtual router 300 may access and update tables using RCU (Read Copy Update) locks.

To send packets to other compute nodes or switches, virtual router 306A uses one or more physical interfaces 332. In general, virtual router 306A exchanges packets with workloads 104 or 106 (FIG. 2) via one or more of VPCs 110. In some examples, virtual router 306A has multiple virtual network interfaces (e.g., vifs). These interfaces may include the kernel interface, vhost0, for exchanging packets with the host operating system; an interface with virtual router agent 314, pkt0, to obtain forwarding state from the network controller and to send up exception packets. There may be one or more virtual network interfaces corresponding to the one or more physical network interfaces 332. In some examples, virtual router 306A shares a virtual interface with another virtual router facing towards one or more of VPCs 110 (towards workloads 104 or 106). In such a case, virtual router 306A and the other virtual router may be in an active/standby configuration, such as that of CNR 250A and CNR 250B of FIG. 3.

In a kernel-based deployment of virtual router 306A (not shown), virtual router 306A is installed as a kernel module inside the operating system. Virtual router 306A registers itself with the TCP/IP stack to receive packets from any of the desired operating system interfaces that it wants to. The interfaces can be bond, physical, tap (for VMs), veth (for containers) etc. Virtual router 306A in this mode relies on the operating system to send and receive packets from different interfaces. For example, the operating system may expose a tap interface backed by a vhost-net driver to communicate with VMs. Once virtual router 306A registers for packets from this tap interface, the TCP/IP stack sends all the packets to it. Virtual router 306A sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 306A, virtual router 306A is installed as a user space 345 application that is linked to the DPDK library. This may lead to faster performance than a kernel-based deployment, particularly in the presence of high packet rates. The physical interfaces 332 are used by the poll mode drivers (PMDs) of DPDK rather the kernel's interrupt-based drivers. The registers of physical interfaces 332 may be exposed into user space 345 in order to be accessible to the PMDs; a physical interface 332 bound in this way is no longer managed by or visible to the host operating system, and the DPDK-based virtual router 306A manages the physical interface 332. This includes packet polling, packet processing, and packet forwarding. In other words, user packet processing steps are performed by the virtual router 306A DPDK data plane. The nature of this "polling mode" makes the virtual router 306A DPDK data plane packet processing/forwarding much more efficient as compared to the interrupt mode when the packet rate is high. There are comparatively few interrupts and context switching during packet I/O, compared to kernel-mode virtual router 306A, and interrupt and context switching during packet I/O may in some cases be avoided altogether.

In general, each of pods 302A-302B may be assigned one or more virtual network addresses for use within respective virtual networks, where each of the virtual networks may be associated with a different virtual subnet provided by virtual router 306A. Pod 302B may be assigned its own virtual layer three (L3) IP address, for example, for sending and receiving communications but may be unaware of an IP address of the computing device 300 on which the pod 302B executes. The virtual network address may thus differ from the logical address for the underlying, physical computer system, e.g., computing device 300.

Computing device 300 includes a virtual router agent 314 that controls the overlay of virtual networks for computing device 300 and that coordinates the routing of data packets within computing device 300. In general, virtual router agent 314 communicates with network controller 24 for the virtualization infrastructure, which generates commands to create virtual networks and configure network virtualization endpoints, such as computing device 300 and, more specifically, virtual router 306A, as a well as virtual network interface 212. By configuring virtual router 306A based on information received from network controller 24, virtual router agent 314 may support configuring network isolation, policy-based security, a gateway, source network address translation (SNAT), a load-balancer, and service chaining capability for orchestration.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 306A implements one or more virtual routing and forwarding instances (VRFs), such as VRF 322A, for respective virtual networks for which virtual router 306A operates as respective tunnel endpoints. In general, each VRF 322 stores forwarding information for the corresponding virtual network or a VPC and identifies where data packets are to be forwarded and whether the packets are to be encapsulated in a tunneling protocol, such as with a tunnel header that may include one or more headers for different layers of the virtual network protocol stack. Each of VRFs 322 may include a network forwarding table storing routing and forwarding information for the virtual network. For example, virtual router 306A may learn routes from cRPD 324 via virtual router agent 314, which may include an API, and use such learned routes to construct a forwarding table for each VRF 322.

cRPD 324, acting as a control plane for virtual router 306A, may learn BGP routes of packets flowing through computing device 300. As such, cPRD 324 may program route tables for virtual routers 306 (e.g., via virtual router agent 314). VPC table programmer 326 may communicate with cPRD 324 to learn BGP routes of packets flowing through computing device 300. VPC table programmer 326 may be a table programming agent configured to program VPC route tables, such as VPC route tables 118, of VPC gateways 110. While shown as part of pod 302B, in some examples, rather than being part of a same pod, cPRD 324 and VPC table programmer may be part of different pods. For example, VPC table programmer 326 may execute in a separate pod of pods 302. In some examples, VPC table programmer 326 may be configured to utilize an API, such as an API of a VPC gateway, to interface with the VPC gateway when programming the VPC route table.

VPC route tables 118 may change from instance to instance. For example, if a VPC is restarted, an associated VPC route table may change. In some examples, VPC table programmer 326 may abstract a VPC route table away from a configuration point of view. For example, VPC table programmer 326 may enable an administrator to interact with the VPC route table using a tag (which may be more descriptive), such as "vpc-table-tag":"cnr-aws-vpc-internal-table," rather than a name, such as "RouteTableId": "rtb-08fdf3cc822baa22c." VPC table programmer 326 may perform any translations such as to apply the appropriate policies to the appropriate VPC route tables, or update the appropriate VPC route tables.

An example mapping which VPC table programmer 326 may perform for a VPC gateway 118 follows:

```
[
 {
  "cnr-table-name": "inet.0",
  "cnr-policy-name":"inet-aws-export",
  "cnr-nexthop-interface-name": "eth3",
```

-continued

```
  "vpc-table-tag":"cnr-aws-vpc-internal-table"
 },
 {
  "cnr-table-name": "oam.inet.0",
  "cnr-policy-name":"oam-aws-export",
  "cnr-nexthop-interface-name": "eth5",
  "vpc-table-tag":"cnr-aws-vpc-external-table-oam"
 },
 {
  "cnr-table-name": "sig.inet.0",
  "cnr-policy-name":"sig-aws-export",
  "cnr-nexthop-interface-name": "eth4",
  "vpc-table-tag":"cnr-aws-vpc-external-table-sig"
 },
]
```

An example policy statement follows:

```
policy-statement inet-aws-export {
  term 1 {
    from {
      protocol bgp;
      as-path [ as-path-infra-cluster aws-onsite-cluster ];
    }
    then accept;
  }
  then reject;
}
```

An example of programming of a route table towards on-prem network 130 follows:

```
"RouteTables": [
  {
    "RouteTableId": "rtb-08fdf3cc822baa22c",
    "Routes": [
      {
    "DestinationCidrBlock": "10.10.10.4/32",
    "InstanceId": "i-04d12991242918ed8"
    "InstanceOwnerId": "956845549706".
    "NetworkInterfaceId": "eni-0b91bb9d332b6529e",
    "Origin": "CreateRoute",
    "State": "active"
      },
      {
        "DestinationCidrBlock": "10.10.10.17/32",
    "InstanceId": "i-04d12991242918ed8",
    "InstanceOwnerId": "956845549706",
    "NetworkInterfaceId": "eni-0b91bb9d332b6529e",
    "Origin": "CreateRoute",
    "State": "active"
      }
    ],
    "Tags": [
      {
        "Key": "cnr-aws-simulated-vpc-table-sig",
         "Value": ""
      }
     ],
    "VpcId": "vpc-09f812bf56bdee948",
    "OwnerId": "956845549706"
  }
]
```

For traffic flowing towards workloads 104 and 106, VPC table programmer 326 may program an L2 DMAC to identify an appropriate node.

NIC 330 may receive packets having BGP headers. Virtual router 306A processes the packet to determine, from the BGP header, to which BGP speaker the packet is to be routed. For example, a first packet from on-prem network 130 may be destined for BGPS2 of workloads 104B, or a second packet from BGPS1 of workload 106B may be destined for Internet 140 (each of FIG. 2). Virtual router 306A may route the first received packet to VPC 110A and route the second received packet to VPC 116.

Pod 302A includes one or more application containers 329A. Pod 302B includes an instance of cRPD 324. Container platform 304 includes container runtime 308, orchestration agent 310, service proxy 311, and CNI 312.

Container engine 308 includes code executable by microprocessor 320. Container runtime 308 may be one or more computer processes. Container engine 308 runs containerized applications in the form of containers 329A-329B. Container engine 308 may represent a Dockert, rkt, or other container engine for managing containers. In general, container engine 308 receives requests and manages objects such as images, containers, networks, and volumes. An image is a template with instructions for creating a container. A container is an executable instance of an image. Based on directives from controller agent 310, container engine 308 may obtain images and instantiate them as executable containers in pods 302A-302B.

Service proxy 311 includes code executable by microprocessor 320. Service proxy 311 may be one or more computer processes. Service proxy 311 monitors for the addition and removal of service and endpoints objects, and it maintains the network configuration of the computing device 300 to ensure communication among pods and containers, e.g., using services. Service proxy 311 may also manage iptables to capture traffic to a service's virtual IP address and port and redirect the traffic to the proxy port that proxies a backed pod. Service proxy 311 may represent a kube-proxy for a minion node of a Kubernetes cluster. In some examples, container platform 304 does not include a service proxy 311 or the service proxy 311 is disabled in favor of configuration of virtual router 306A and pods 302 by CNI 312.

Orchestration agent 310 includes code executable by microprocessor 320. Orchestration agent 310 may be one or more computer processes. Orchestration agent 310 may represent a kubelet for a minion node of a Kubernetes cluster. Orchestration agent 310 is an agent of an orchestrator, e.g., orchestrator 23 of FIG. 1, that receives container specification data for containers and ensures the containers execute by computing device 300. Container specification data may be in the form of a manifest file sent to orchestration agent 310 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 302 of containers 329. Based on the container specification data, orchestration agent 310 directs container engine 308 to obtain and instantiate the container images for containers 329, for execution of containers 329 by computing device 300.

Orchestration agent 310 instantiates or otherwise invokes CNI 312 to configure one or more virtual network interfaces for each of pods 302. For example, orchestration agent 310 receives a container specification data for pod 302A and directs container engine 308 to create the pod 302A with containers 329A based on the container specification data for pod 302A. Orchestration agent 310 also invokes the CNI 312 to configure, for pod 302A, virtual network interface for a virtual network corresponding to VRFs 322A. In this example, pod 302A is a virtual network endpoints for a virtual network corresponding to VRF 322A.

CNI 312 may obtain interface configuration data for configuring virtual network interfaces for pods 302. Virtual router agent 314 may operate as a virtual network control plane module for enabling network controller 24 to configure virtual router 306A. Unlike the orchestration control plane (including the container platforms 304 for minion nodes and the master node(s), e.g., orchestrator 23), which manages the provisioning, scheduling, and managing virtual execution elements, a virtual network control plane (including network controller 24 and virtual router agent 314 for minion nodes) manages the configuration of virtual networks implemented in the data plane in part by virtual routers 306A of the minion nodes. Virtual router agent 314 communicates, to CNI 312, interface configuration data for virtual network interfaces to enable an orchestration control plane element (i.e., CNI 312) to configure the virtual network interfaces according to the configuration state determined by the network controller 24, thus bridging the gap between the orchestration control plane and virtual network control plane. In addition, this may enable a CNI 312 to obtain interface configuration data for multiple virtual network interfaces for a pod and configure the multiple virtual network interfaces, which may reduce communication and resource overhead inherent with invoking a separate CNI 312 for configuring each virtual network interface.

Figure 5:
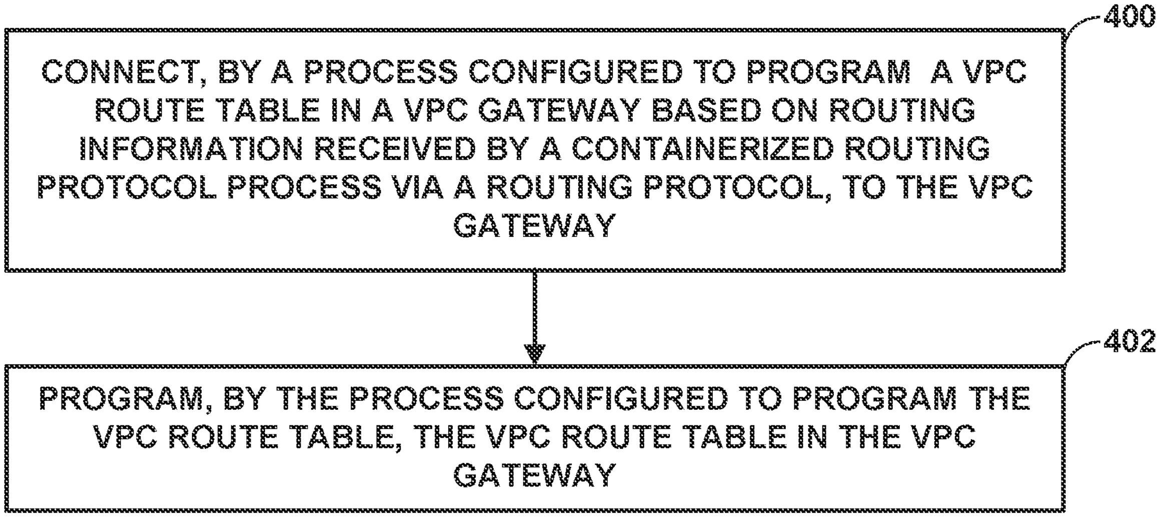
FIG. 5 is a flow diagram illustrating example CNR VPC techniques according to one or more aspects of this disclosure.

FIG. 5 is a flow diagram illustrating example CNR VPC techniques according to one or more aspects of this disclosure. VPC table programmer 326 of a containerized router such as CNR 150, may connect to VPC gateway 110A (400). VPC table programmer 326 may include a process (e.g., an application) configured to program a virtual private cloud (VPC) route table (e.g., VPTRT 118A) in a VPC gateway (e.g., VPC 110A) based on routing information received by a containerized routing protocol process (e.g., cPRD 25A) via a routing protocol, to the VPC gateway. For example, CNR 150 may utilize API 116A to connect to VPC gateway 110A for programming purposes. CNR 150 may program VPC route table 118A in VPC gateway 110A (402).

In some examples, CNR 150 may program VPC route table 118A so as to cause VPC gateway 110A to direct network traffic from VPC gateway 110A to CNR 150. For example, CNR 150 may program VPC route table 118A to indicate that a forwarding next hop is CNR 150. For example, the forwarding next hop may be a virtual IP address associated with CNR 150, a MAC address associated with CNR 150, an address of an interface associated with CNR 150, or the like.

In some examples, CNR 150 is configured to receive network traffic from VPC gateway 110A and forward the network traffic towards on-prem 130. In some examples, the routing protocol includes BGP.

In some examples, VPC gateway 110A is coupled to one or more border gateway protocol (BGP) virtual devices (e.g., BGP speakers BGPS1-BGPSN) via one or more respective links. In some examples, the one or more BGP virtual devices comprise one or more Kubernetes pods, each associated with a respective Kubernetes worker (e.g., workers 104 and/or 106). In some examples, each respective Kubernetes worker comprises at least one service pod (e.g., P1 and/or P2) the service pod being for a service other than BGP protocol. In some examples, the one or more respective links comprise one or more respective Ethernet links.

In some examples, VPC gateway 110A is not capable of learning routes directly from BGP speakers BGPS1-BGPSN. In some examples, VPC gateway 110A includes a physical device or a virtual device. In some examples, VPC gateway 110A includes a first VPC gateway, VPC route table 118A includes a first VPC route table, CNR 150 is further configured to program a second VPC route table (e.g., VPC route table 118N) in a second VPC gateway (e.g., VPC gateway 110N), wherein the second VPC route table is different than the first VPC route table. In some examples, as part of programing VPC route table 118A in VPC gateway 110A, CNR 150 is configured to apply a policy to routes.

Figure 6:
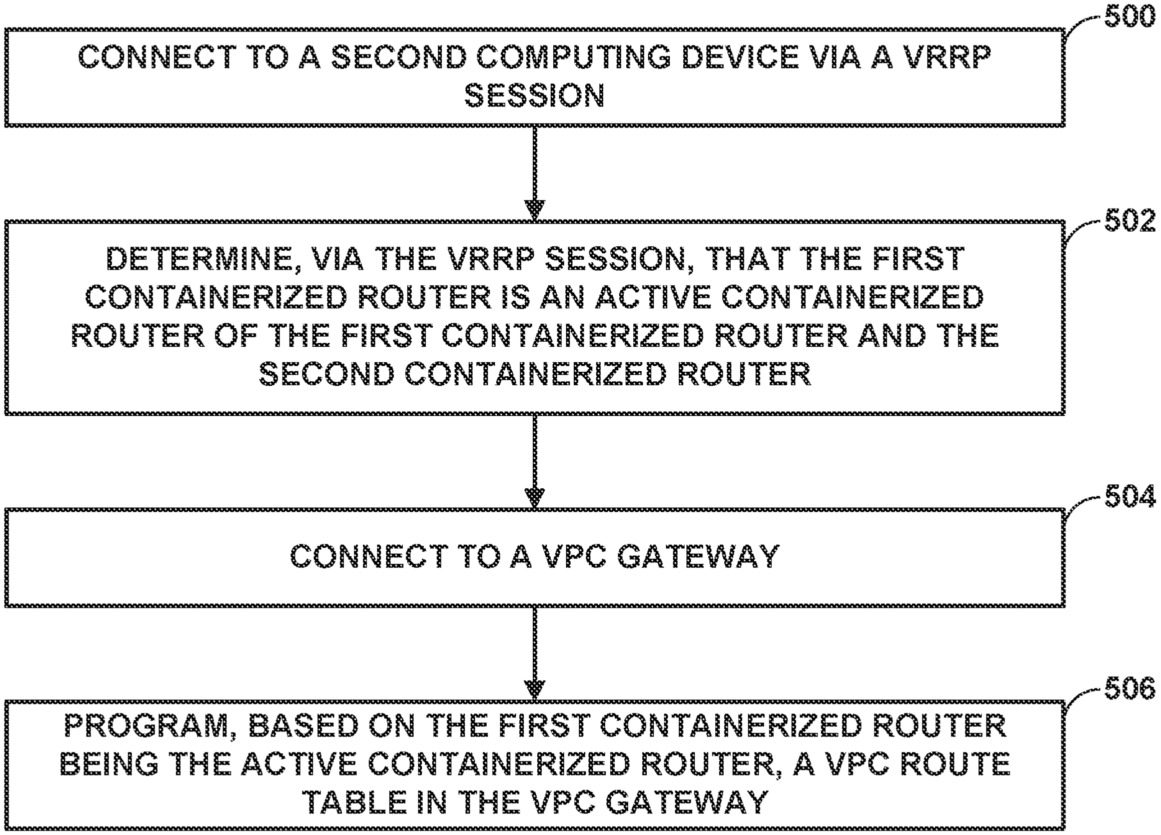
FIG. 6 is a flow diagram illustrating example redundant CNR VPC techniques according to one or more aspects of this disclosure.

FIG. 6 is a flow diagram illustrating example redundant CNR VPC techniques according to one or more aspects of this disclosure. CNR 250B may connect to CNR 250A via a VRRP session 302 (500). For example, CNR 250A and CNR 250B may establish VRRP session 302 for redundancy purposes. CNR 250B may determine, via VRRP session that CNR 250B is an active CNR of CNR 250A and CNR 250B (502). For example, based on the VRRP session, CNR 250B may become the active CNR, for example, either by election or by CNR 250A being an active CNR that goes down. CNR 250B may connect to VPC gateway 210 via API 216A (504). For example, CNR 250B may utilize API 216A to connect to VPC gateway 210 for programming purposes. It should be noted that CNR 250B may connect to VPC gateway 210 via API 216A before, during, or after CNR 250B becoming the active CNR. In some examples, CNR 250B may connect to VPC gateway 210 based on CNR 250B being the active CNR. Based on being the active CNR, CNR 250B may program VPC route table 218 in VPC gateway 210 (506). In some examples, VRRP session 302 comprises a unicast session.

In some examples, CNR 250B includes a VRRP component 214B. For example, VRRP component 214B may execute on processing circuitry, such as microprocessor 320 (FIG. 4). In some examples, one of CNR 250A or CNR 250B is configured as an active computing device and another of CNR 250A or CNR 250B is configured as a standby computing device. In some examples, CNR 250B is configured to share a virtual IP address with CNR 250A on an interface facing one or more worker nodes 204 of a data center 10 (FIG. 1).

In some examples, CNR 250B is configured as the standby computing device, wherein CNR 250B is further configured to: determine a failure of CNR 250A via the VRRP session and, in response to the determination of the failure, assume a role of the active computing device and update VPC route table 218 of VPC gateway 210. In some examples, as part of updating VPC route table 218, CNR 250B is configured to update VPC route table 218 to direct network traffic from VPC gateway 210 to CNR 250B, wherein prior to updating VPC route table 218, VPC route table 218 directed the network traffic from VPC gateway 210 to CNR 250A. In some examples, as part of updating VPC route table 218, CNR 250B is configured to update VPC routing table 218 to indicate a forwarding next hop is CNR 250B.

In some examples, as part of updating VPC route table 218, CNR 250B may configured to send a gratuitous address resolution protocol (ARP) message to VPC gateway 210. In some examples, CNR 250B is further configured to, in response to assuming the role of the active computing device, modify at least one of a BGP local preference attribute or a BGP MED attribute to direct traffic from an on-prem router to a route advertised by CNR 250B.

The techniques described herein may be implemented in hardware, software, firmware, or any combination thereof. Various components, functional units, and/or modules illustrated in the figures and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise one or more computer data storage mediums, such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device configured with a first containerized router, the computing device comprising:

one or more processors; and one or more memories comprising instructions executable by the one or more processors to cause the computing device to:

implement a containerized virtual router configured to execute on the one or more processors and configured to implement a data plane for the first containerized router; and implement a containerized routing protocol process configured to execute on the one or more processors and configured to implement a control plane for the first containerized router wherein the containerized routing protocol process is configured to execute a routing protocol, wherein the first containerized router is configured to program a virtual private cloud (VPC) route table in a VPC gateway based on routing information received by the containerized routing protocol process via the routing protocol and wherein the first containerized router is communicatively coupled to a second containerized router via a virtual router redundancy protocol (VRRP) session.

2. The computing device of claim 1, wherein the VRRP session comprises a unicast session.

3. The computing device of claim 1, wherein the instructions further cause the one or more processors to implement a VRRP component.

4. The computing device of claim 1, wherein one of the first containerized router or the second containerized router is configured as an active containerized router and another of the first containerized router or the second containerized router is configured as a standby containerized router for multihoming with a VPC gateway.

5. The computing device of claim 1, wherein the first containerized router is configured to share a virtual IP address with the second containerized router on an interface facing one or more worker nodes of a data center.

6. The computing device of claim 1, wherein the first containerized router is configured as the standby containerized router, wherein the first containerized router is further configured to:

determine a failure of the second containerized router via the VRRP session; and in response to the determination of the failure, assume a role of the active containerized router and update the VPC route table of the VPC gateway via the API.

7. The computing device of claim 6, wherein as part of updating the VPC route table the process configured to program the VPC route table is configured to update the VPC route table to direct network traffic from the VPC gateway to the first containerized router, wherein prior to updating the VPC route table, the VPC route table directed the network traffic from the VPC gateway to the second containerized router.

8. The computing device of claim 7, wherein as part of updating the VPC route table, the process configured to program the VPC route table is configured to update the VPC route table to indicate a forwarding next hop is the first containerized router.

9. The computing device of claim 6, wherein as part of updating the VPC route table, the process configured to program the VPC route table is configured to send a gratuitous address resolution protocol (ARP) message to the VPC gateway.

10. The computing device of claim 6, wherein the first containerized router is further configured to, in response to assuming the role of the active containerized router, modify at least one of a border gateway protocol (BGP) local preference attribute or a BGP MED attribute to direct traffic from an on-prem router to a route advertised by the first containerized router.

11. A computer network method comprising:

connecting, by a first containerized router to a second containerized router, via a virtual router redundancy protocol (VRRP) session;

determining, via the VRRP session, that the first containerized router is an active containerized router of the first containerized router and the second containerized router;

connecting, by a process configured to program a virtual private cloud (VPC) route table, to a VPC gateway, the VPC gateway comprising the VPC route table; and programming, by the process configured to program the VPC route table, and based on the first containerized router being the active containerized router, the VPC route table in the VPC gateway.

12. The method of claim 11, wherein the VRRP session comprises a unicast session.

13. The method of claim 11, wherein the second containerized router is configured as a standby containerized router.

14. The method of claim 11, further comprising sharing, by the first containerized router, a virtual IP address with the second containerized router on an interface facing one or more worker nodes of a data center.

15. The method of claim 11, wherein determining that the first containerized router is the active containerized router comprises:

determining, by the first containerized router, a failure of the second containerized router via the VRRP session; and in response to the determination of the failure, assuming, by the first containerized router, a role of the active containerized router and updating, by the first containerized router, the VPC route table of the VPC gateway via the API.

16. The method of claim 15, wherein updating the VPC route table comprises updating, by the process configured to program the VPC route table, the VPC route table to direct network traffic from the VPC gateway to the first containerized router, wherein prior to updating the VPC route table, the VPC route table directed the network traffic from the VPC gateway to the second containerized router.

17. The method of claim 16, wherein updating the VPC route table comprises updating the VPC route table to indicate a forwarding next hop is the first containerized router.

18. The method of claim 15, wherein updating the VPC route table comprises sending a gratuitous address resolution protocol (ARP) message to the VPC gateway.

19. The method of claim 15, further comprising, modifying, in response to assuming the role of the active containerized router, at least one of a border gateway protocol (BGP) local preference attribute or a BGP MED attribute to direct traffic from an on-prem router to a route advertised by the first containerized router.

20. One or more computer-readable storage media, comprising instructions executable by one or more processing resources to cause a computing device to:

connect to a second containerized router via a virtual router redundancy protocol (VRRP) session;

determine, via the VRRP session, that the first containerized router is an active containerized router of the first containerized router and the second containerized router;

connect to a virtual private cloud (VPC) gateway, the VPC gateway comprising a VPC route table; and program, based on the first containerized router being the active containerized router, the VPC route table in the VPC gateway.

* * * * *